US012173841B2

(12) United States Patent
LaPalme

(10) Patent No.: US 12,173,841 B2
(45) Date of Patent: Dec. 24, 2024

(54) APPARATUS FOR MOUNTING RADIO EQUIPMENT TO A TOWER IN A CELLULAR COMMUNICATION SYSTEM

(71) Applicant: DISH Wireless L.L.C., Englewood, CO (US)

(72) Inventor: Jerome A. LaPalme, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/887,166

(22) Filed: Aug. 12, 2022

(65) Prior Publication Data

US 2023/0057870 A1 Feb. 23, 2023

Related U.S. Application Data

(60) Provisional application No. 63/260,510, filed on Aug. 23, 2021.

(51) Int. Cl.
*F16M 13/02* (2006.01)
*H01Q 1/12* (2006.01)

(52) U.S. Cl.
CPC .......... *F16M 13/02* (2013.01); *H01Q 1/1207* (2013.01)

(58) Field of Classification Search
CPC ..... G09F 2007/1804; G09F 2007/1808; G09F 2007/1813; G09F 2007/1817; G09F 2007/1821; G09F 2007/1826; G09F 2007/183; F16M 13/02; H01Q 1/1207
USPC ......... 248/218.4, 219.1, 219.3, 219.4, 230.8, 248/228.8
See application file for complete search history.

(56) References Cited

U.S. PATENT DOCUMENTS

| | | | | |
|---|---|---|---|---|
| 4,917,338 A * | 4/1990 | Olson | ....................... | G09F 7/18 248/214 |
| 6,581,891 B1 * | 6/2003 | Byrd | ....................... | A47B 5/04 248/230.8 |
| 6,766,992 B1 * | 7/2004 | Parker | .................. | F16M 13/022 248/219.3 |
| 7,594,631 B1 * | 9/2009 | Carnevali | ........... | B60R 11/0241 248/289.11 |
| 7,810,265 B2 * | 10/2010 | Beatty | ....................... | G09F 7/18 40/607.14 |
| 7,861,981 B2 * | 1/2011 | Olver | ....................... | H02G 3/32 248/65 |
| 7,997,546 B1 * | 8/2011 | Andersen | .................. | F16B 2/06 248/230.8 |
| 9,200,654 B1 * | 12/2015 | Parduhn | .................... | F16B 2/08 |

(Continued)

*Primary Examiner* — Alfred J Wujciak
(74) *Attorney, Agent, or Firm* — KW Law, LLP

(57) ABSTRACT

The subject matter disclosed here relates to a mounting system that facilitates mounting of an antenna structure or other communication equipment to a tower pole in a cellular communication system. In general, the mounting system includes a mounting bracket and a plurality of bands that encircle the tower pole and pull the mounting bracket toward the tower pole. The mounting bracket includes a mounting surface, two side flanges, and a top and bottom flange. In general, the mounting surface is configured to receive communication equipment and may be configured to attach to multiple different types of antenna structures from different manufacturers. The bracket may thus offer a "universal" type mount. The two side flanges of the mounting bracket extend from the mounting surface at angles that engage with the outer surface of the tower pole.

20 Claims, 10 Drawing Sheets

(56) References Cited

U.S. PATENT DOCUMENTS

| | | | |
|---|---|---|---|
| 9,869,331 B2 * | 1/2018 | Muntasser | F16B 2/08 |
| 2009/0230266 A1 * | 9/2009 | Hillstrom | F16M 13/022 |
| | | | 248/219.4 |
| 2014/0103130 A1 * | 4/2014 | Brown | F16M 13/02 |
| | | | 237/66 |
| 2018/0090916 A1 * | 3/2018 | Jett | F16M 13/02 |
| 2018/0102074 A1 * | 4/2018 | Peters | G09F 17/00 |
| 2020/0370707 A1 * | 11/2020 | Palanisamy | F16B 2/08 |
| 2022/0243867 A1 * | 8/2022 | Tsorng | F16M 11/18 |

* cited by examiner

APPARATUS FOR MOUNTING RADIO EQUIPMENT TO A TOWER IN A CELLULAR COMMUNICATION SYSTEM

CROSS REFERENCE TO RELATED APPLICATIONS

This application claims priority to U.S. Provisional Patent application No. 63/260,510 entitled "APPARATUS FOR MOUNTING AN ANTENNA STRUCTURE TO A TOWER IN A CELLULAR COMMUNICATION SYSTEM" and filed on Aug. 23, 2021, which is incorporated herein by reference.

TECHNICAL FIELD

Embodiments of the subject matter described herein relate generally to brackets used to mount components in a cellular communications system. For example, embodiments of the disclosed mounting apparatus can mount an antenna structure to a mast or other support structure.

BACKGROUND

A cellular communication system includes base stations (also known as cell sites) distributed throughout a geographical region. A base station includes equipment such as an antenna, mounting and support structure, one or more transceiver radio units (RUs), and the like. In a typical cellular communication system, the antennas are mounted on a tower or other raised structures to provide good signal coverage. In some area the size and structure of an antenna tower is limited by factors such as local regulations. For example, some local jurisdictions require antenna towers to be at least partially concealed from view. As such, the antennas may be required to fit within a relatively small concealment structure. Such requirements can make it difficult to properly attach antennas to the tower, especially for large 5G antennas.

BRIEF SUMMARY

Disclosed here is a mounting system to mount an antenna structure for a cellular communication system to a tower pole. An exemplary embodiment of the mounting system includes: a mounting bracket to attach to the antenna structure, the at least one mounting bracket including: a mounting surface; a first side flange extending from the mounting surface, the first side flange including a first plurality of slots; a second side flange extending from the mounting surface, the second side flange including a second plurality of slots; a top flange extending from the top of the mounting surface; and a bottom flange extending from bottom of the mounting surface; and a plurality of bands, each of the plurality of bands extending through one of the first plurality of slots and one of the second plurality of slots and encircling the pole to sure the mounting bracket to the pole.

Also disclosed is an embodiment of a system having: a mounting bracket to attach to the antenna structure, the at least one mounting bracket including: a mounting surface, the mounting surface including a plurality of mounting holes though the mounting surface for attaching to the antenna structure; a first side flange extending from the mounting surface at an angle between 73 degrees and 82 degrees relative to the mounting surface, the first side flange including a first plurality of slots; a second side flange extending from the mounting surface at an angle between 73 degrees and 82 degrees to relative to the mounting surface, the second side flange including a second plurality of slots; a top flange extending from the top of the mounting surface, the top flange including a top center cutout and top angled edges at each side of the top center cutout, the top angled edges having an interior angle between 165 degrees and 175 degrees; a bottom flange extending from bottom of the mounting surface, the bottom flange including a bottom center cutout and bottom angled edges at each side of the bottom center cutout, the bottom angled edges having an interior angle between 165 degrees and 175 degrees; a plurality of bands, each of the plurality of bands extending through one of the first plurality of slots and one of the second plurality of slots and encircling the pole to sure the mounting bracket to the pole.

Also disclosed is a mounting system to mount an antenna structure for a cellular communication system to pole that includes: an mounting bracket to attach to the antenna structure, the at least one mounting bracket including: a mounting surface formed from a steel sheet the mounting surface including multiple sets of mounting holes through the mounting surface for mounting different types of antenna structures to the mounting bracket; a first side flange formed by bending a first portion of the steel sheet beyond 90 degrees such that the first side flange extends from the mounting surface at an angle between 73 degrees and 82 degrees relative to the mounting surface, the first side flange including a first plurality of slots extending parallel to the mounting surface; a second side flange formed by bending a second portion of the steel sheet beyond 90 degrees extending such that second side flange extends from the mounting surface at an angle between 73 degrees and 82 degrees to relative to the mounting surface, the second side flange including a second plurality of slots extending parallel to the mounting surface; a top flange formed by bending a third portion of the steel sheet such that the top flange extends from the top of the mounting surface, the top flange including a top center cutout and top angled edges at each side of the top center cutout, the top angled edges having an interior angle between 165 degrees and 175 degrees; a bottom flange formed by bending a fourth portion of the steel sheet such that the bottom flange extends from bottom of the mounting surface, the bottom flange including a bottom center cutout and bottom angled edges at each side of the bottom center cutout, the bottom angled edges having an interior angle between 165 degrees and 175 degrees; a plurality of bands, each of the plurality of bands extending through one of the first plurality of slots and one of the second plurality of slots and encircling the pole to sure the mounting bracket to the pole.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
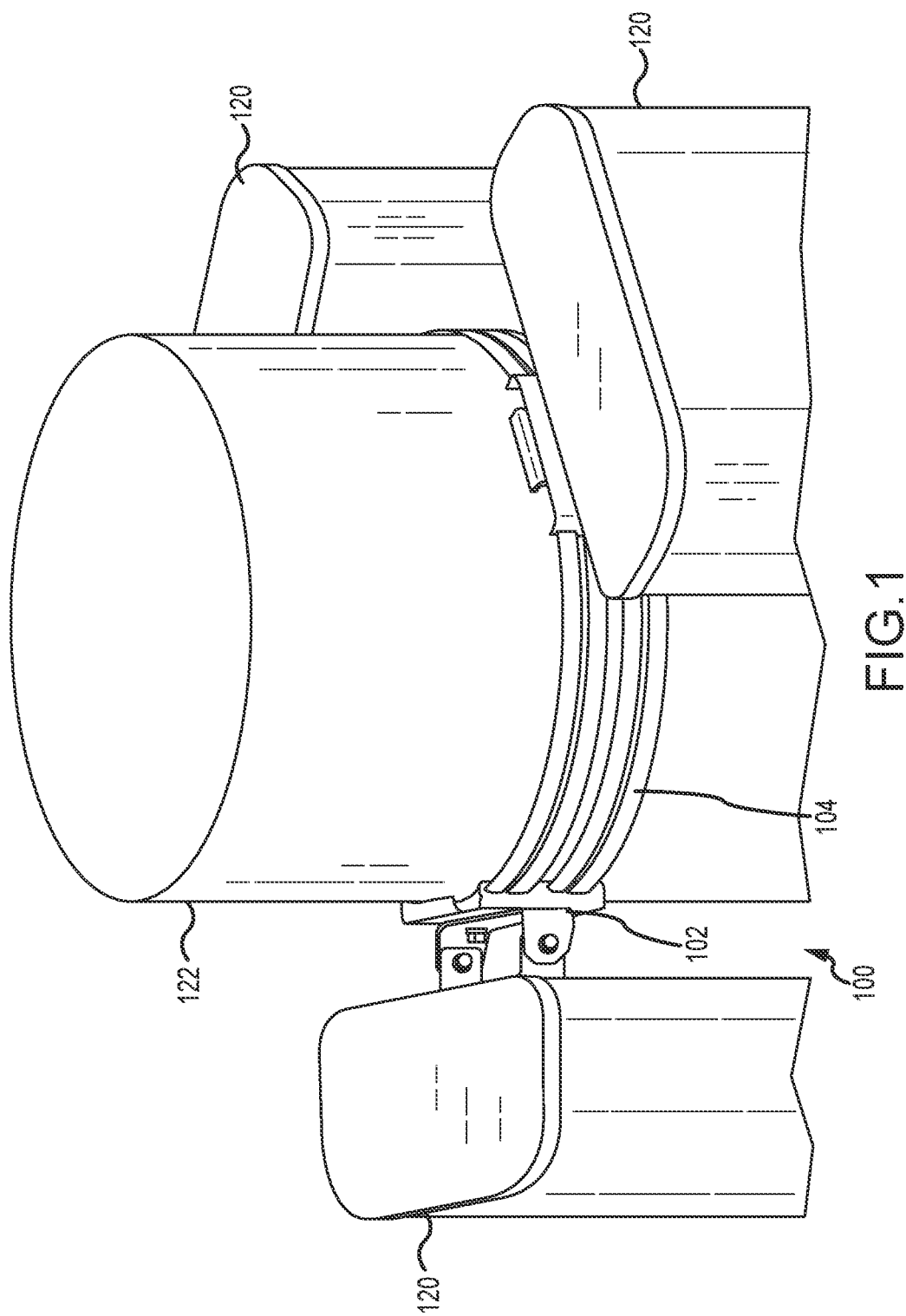
FIG. 1 illustrates a perspective view of three antenna structures mounted to a tower pole using a mounting system in accordance with various embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context. It should be understood that various aspects disclosed herein may be combined in different ways than the arrangements specifically presented in the description and accompanying drawings.

The present disclosure relates to a mounting system that facilitates mounting of an antenna structure to a tower pole in a cellular communication system. In general, the mounting system includes a mounting bracket and a plurality of bands that encircle the tower pole and pull the mounting bracket toward the tower pole. The mounting bracket includes a mounting surface, two side flanges, and a top and bottom flange. In general, the mounting surface is configured to attach to radio components (e.g., an antenna structure) and may further be configured to attach to multiple different types of components from different manufacturers.

Various embodiments thus may provide a "universal" type mount. The two side flanges of the mounting bracket extend from the mounting surface at angles engage with the outer surface of the tower pole. Similarly, the top and bottom flanges are shaped to engage with the outer surface of the tower pole. Thus, when the bands are tightened the flange surfaces engage with the surface of the tower pole and secure the antenna structure to the tower pole using the friction of between the flanges, bands and tower pole.

Furthermore, the mounting brackets described herein can facilitate a relatively compact installation of antennas to the tower pole. Specifically, the flanges of the mounting bracket facilitate a shallow depth of mounting against the tower pole. As such, the communication components can be mounted closer to the tower pole than with many traditional mounting techniques. Mounting brackets of the present disclosure can thus facilitate antenna mounting where space is limited. For example, the mounting bracket can facilitate the mounting of antennas within a relatively small concealment structure where such concealment structures are required. Alternatively, the mounting bracket can facilitate the use of relatively larger antennas within a concealment structure.

Figure 2:
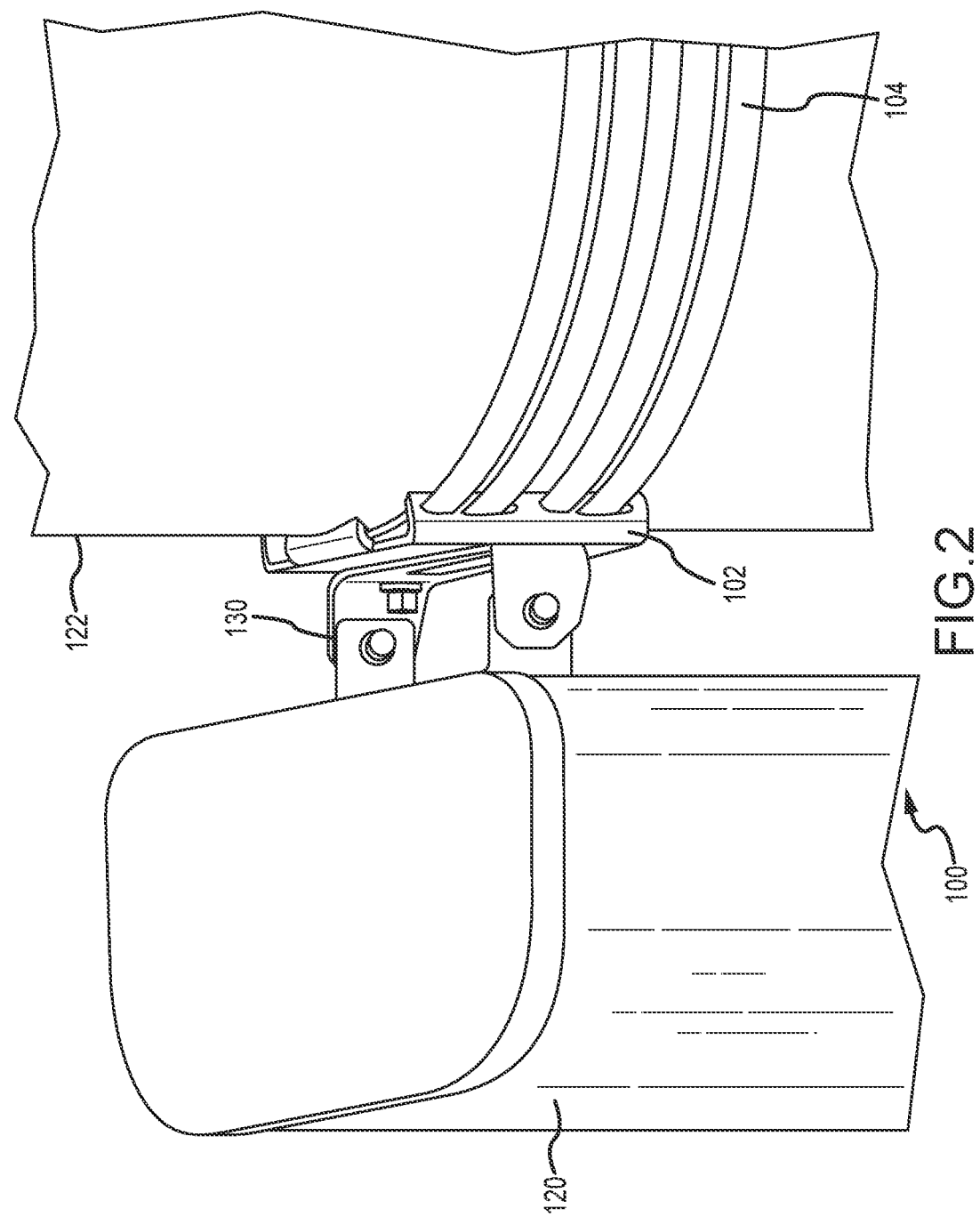
FIG. 2 illustrates a perspective view of an antenna structure mounted to a tower pole using a mounting system in accordance with various embodiments.
Figure 3:
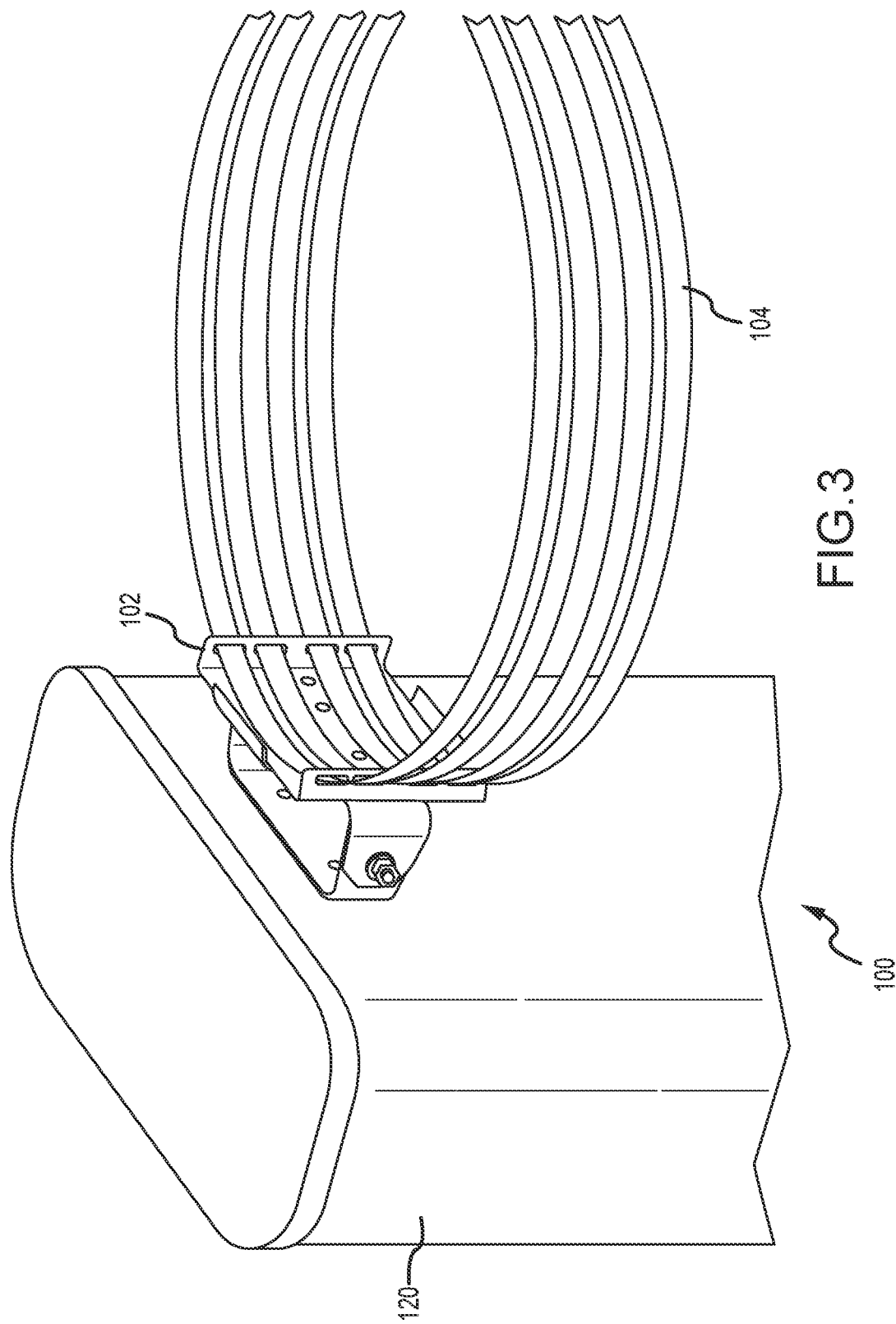
FIG. 3 illustrates a perspective view of an antenna structure and mounting system in accordance with various embodiments.

FIGS. 1-3 show a mounting system 100 for mounting communication equipment or antenna structures 120 to a tower pole 122. In general, the mounting system 100 includes a mounting bracket 102 and a plurality of bands 104 that encircle the tower pole 122 and pull the mounting bracket 102 toward the tower pole 122. Bands disposed about the pole tend to pull mounting brackets 102 radially inward, towards the center of the pole. As will be described in greater detail below, the mounting bracket 102 includes a mounting surface, two side flanges, and a top and bottom flange.

In various embodiments, in response to the plurality of bands 104 being tightened, the flange surfaces engage the surface of the tower pole 122 and couples the antenna structure 120 to the tower pole 122. The friction between the flanges and tower pole 122 generated by the compressive force of the bands tends to resist translation along the surface of the tower pole. The flanges oriented along the circumferential direction of the cylindrical pole may be oriented radially or substantially radially and may include a surface having an arc shape to receive a circumferential segment of a round pole. The flanges oriented along the axial direction of the cylindrical pole may be oriented radially or substantially radially, which may include acute flange angles.

In the example embodiment depicted in FIGS. 1-3, antenna structure 120 is attached to the mounting bracket 102 with component brackets 130. Component brackets 130 may be provided by the manufacturer of antenna structure 120, diplexers, multiplexers, computing devices, radio equipment, or other mountable communication equipment. Mounting bracket 102 supports flush mounting of communication equipment to reduce the radial envelope in mast-mounted applications. Component brackets may be formed integrally with the housing of antenna structure 120, welded or affixed to antenna structure 120, or fastened to antenna structure 120 in various embodiments. In that regard, mounting bracket 102 may accommodate various configurations of component brackets 130 or communication components (e.g., antenna structure 120). Mounting bracket 102 may include several sets of mounting holes to facilitate mounting to different makes and models of communication equipment from different manufacturers.

Figure 4:
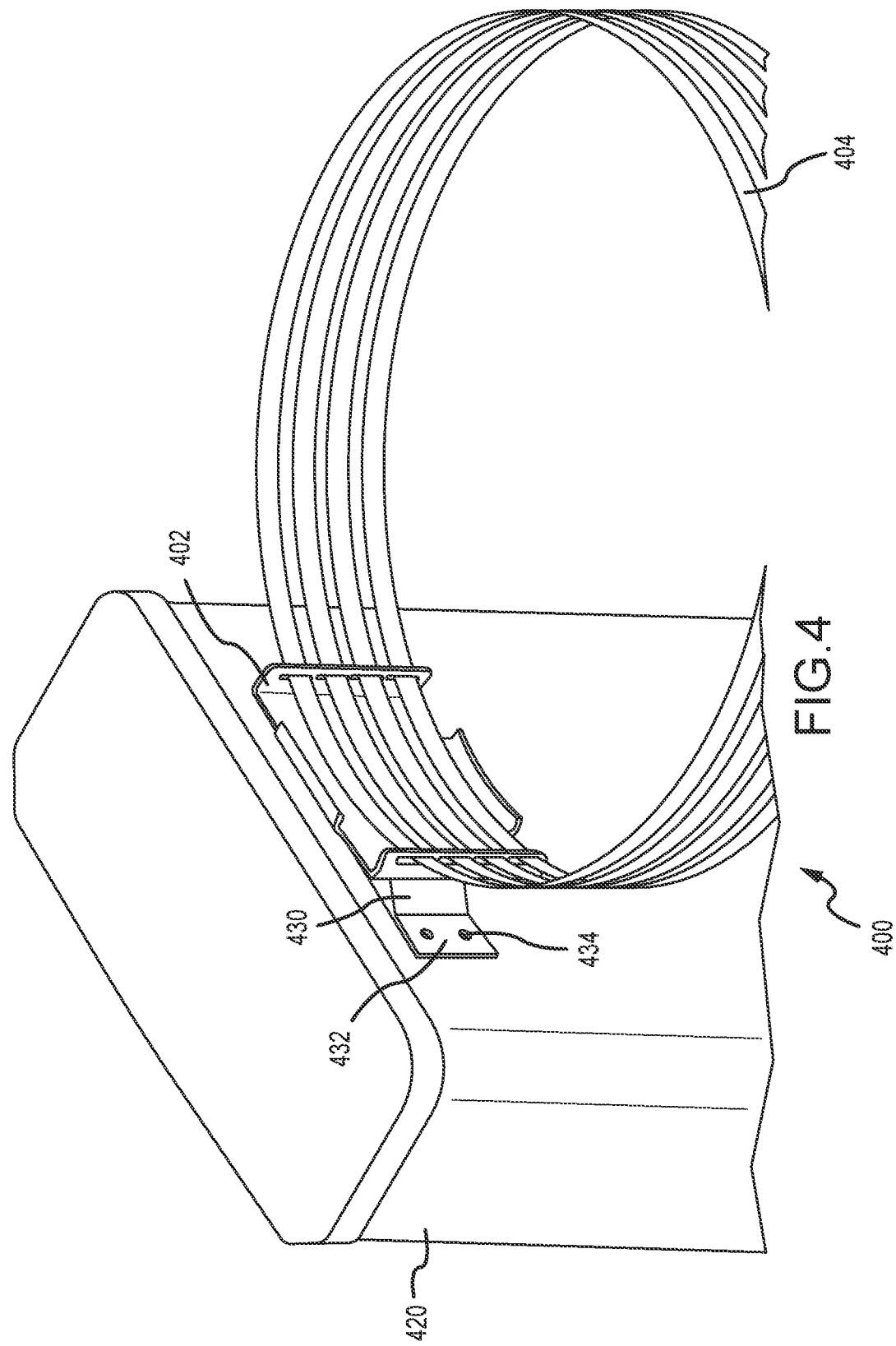
FIG. 4 illustrates a perspective view of an antenna structure and mounting system in accordance with various embodiments.

Turning now to FIG. 4, mounting system 400 is shown for coupling communication equipment 420 to a pole or tower.

Mounting system 400 includes mounting bracket 402 that receives bands 404. Bands 404 extend about a pole or support structure to retain mounting bracket 402 in position relative to the pole or support structure. Mounting bracket 402 is coupled to component bracket 430. Component bracket 430 includes mating flanges 432 that define openings 434. Openings 404 may receive fasteners that pass through the openings and into communications equipment 420 to couple communications equipment 420 to component bracket 430.

In various embodiments, component bracket 430 may be permanently or removably coupled to mounting bracket 402. In some embodiments, component bracket 430 may be formed integrally with or welded to mounting bracket 402. In other embodiments, component bracket 430 may be fastened to or affixed to mounting bracket 402. Mounting system 400 thus couples communications equipment to a support structure through component bracket 430, mounting bracket 402, and bands 404.

Figure 5:
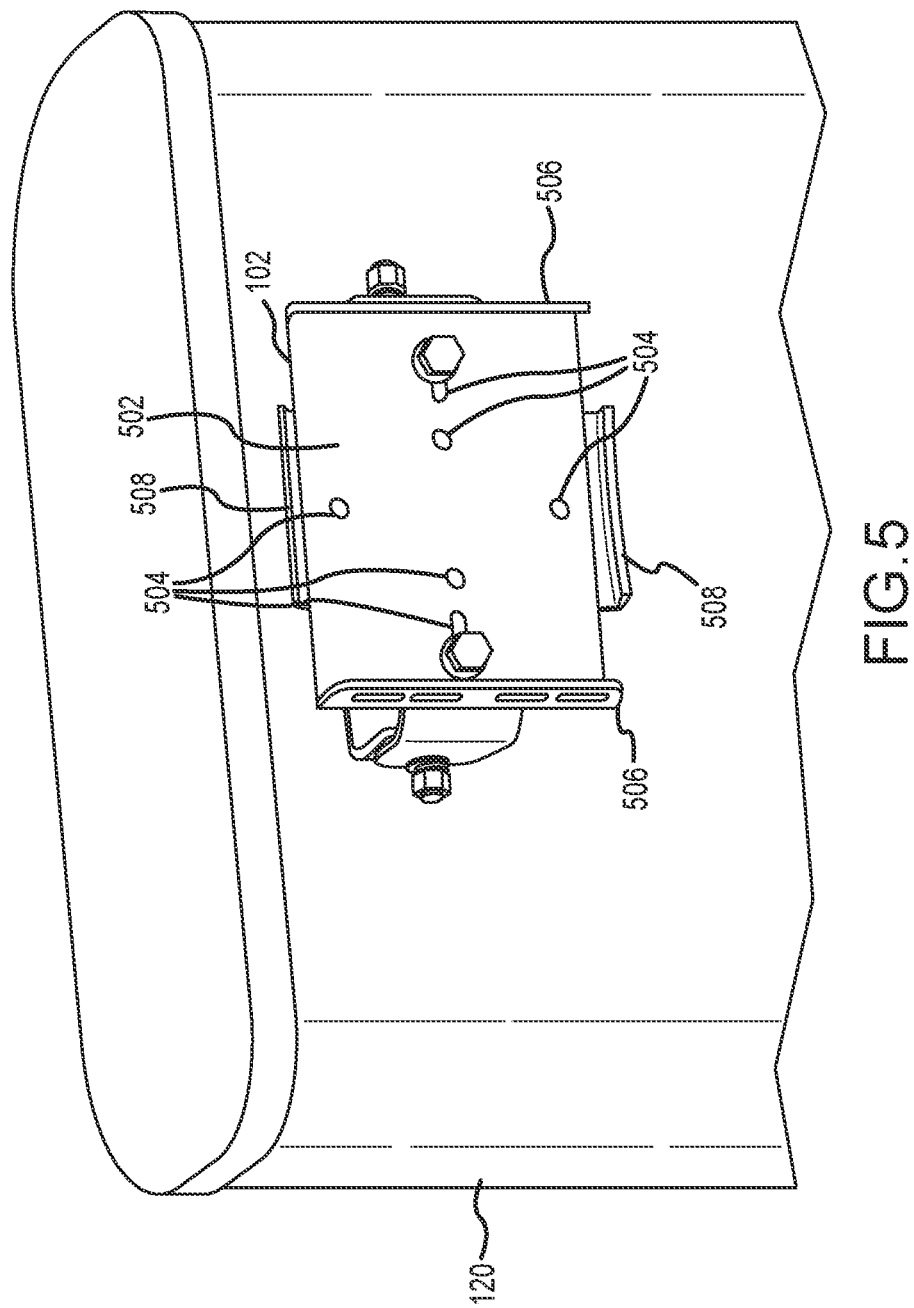
FIG. 5 illustrates a perspective view of a mounting bracket and antenna structure in accordance with various embodiments.

Turning now to FIG. 5, mounting bracket 102 is shown in perspective view, in accordance with various embodiments. Mounting bracket 102 is attached to communications equipment (e.g., antenna structure 120). Mounting bracket 102 includes a mounting surface 502 and a plurality of mounting holes 504 defined through the mounting surface. A plurality of mounting holes 504 may be formed through mounting surface 502 to support communications equipment having various mounting patterns.

In various embodiments, mounting bracket 102 includes a pair of side flanges 506 and top and bottom flanges 508. Mounting bracket 102 of FIG. 5 is depicted with a rectangular profile with side flanges 506 having reflective symmetry and top and bottom flanges 508 having reflective symmetry. Side flanges 506 of mounting bracket 102 extend from the mounting surface 502 at angles to engage the outer surface of the tower pole. Side flanges may be extend radially or substantially radially from the surface of a cylindrical pole in response to being mounted to the pole. Side flanges 506 also extend axially along the length of the cylindrical pole in response to being mounted. In that regard, side flanges 506 define an axial-radial plane (i.e., the plane orthogonal to the tangent line at the circumference of the cylinder) in some embodiments.

Various embodiments include top and bottom flanges 508 shaped to engage with the outer surface of the tower pole. In response to bands tightening about the pole, side flanges 506, top and bottom flanges 508 engage the surface of the tower pole to secure the communication equipment to the tower pole. Friction between the side flanges 506, top and bottom flanges 508, bands, and tower pole tends to retain the communication in place on the pole. Top and bottom flanges 508 may include arc-shaped recesses or other recessed shapes to receive a circumferential segment of a circular pole with increased surface engagement between the flanges and the circular profile of the pole compared to the engagement between a flat, planar surface and a round profile of the pole. Other cutout shapes or contours may be used to improve compatibility with multiple pole diameters.

Figure 6:
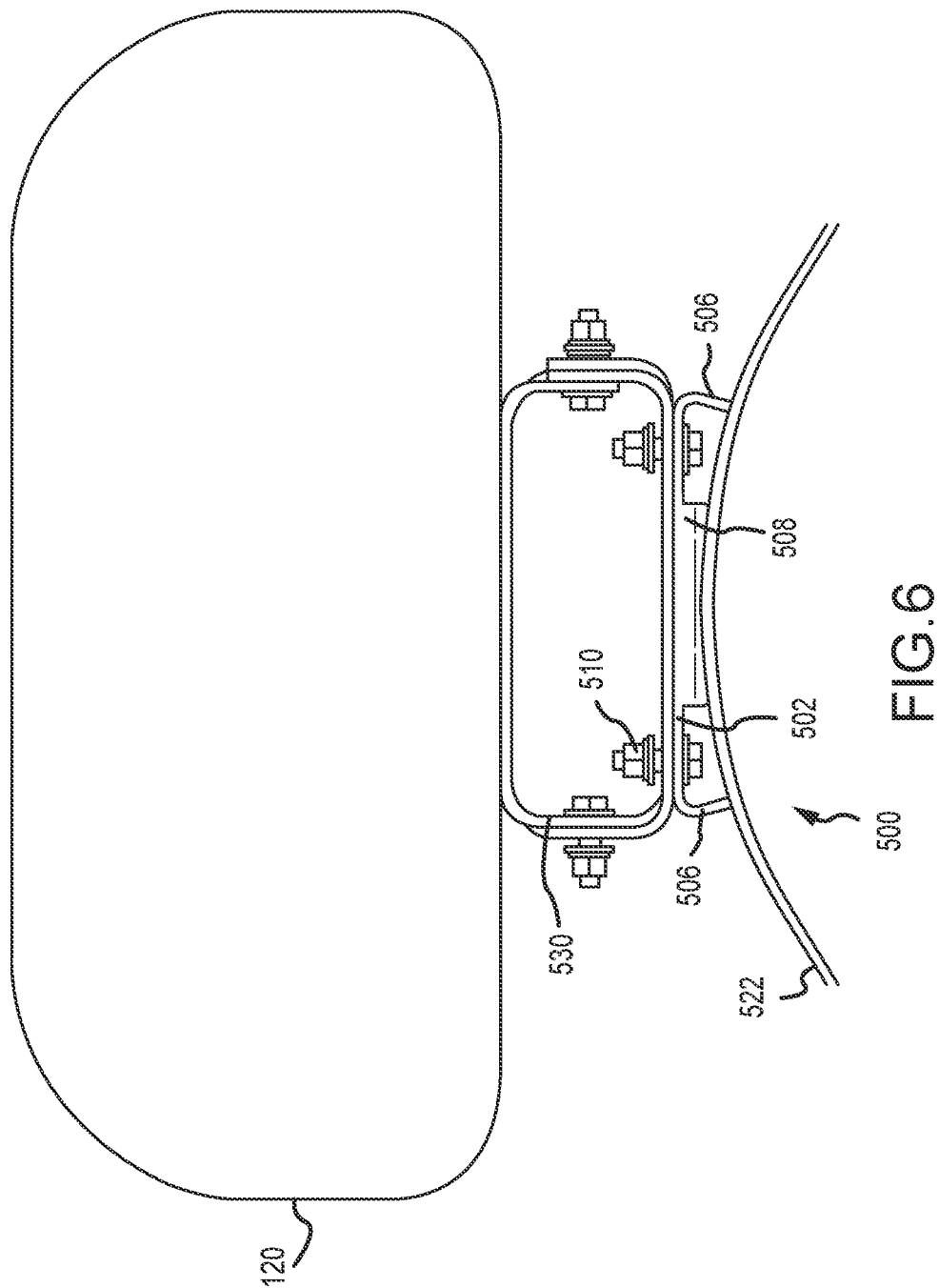
FIG. 6 illustrates a top view of an antenna structure and mounting system in accordance with various embodiments.

With reference to FIG. 6, a top view of the mounting bracket 102 is shown, in accordance with various embodiments. Mounting bracket 102 is attached to antenna structure 120 and tower pole 122. Mounting bracket 102 includes side flanges 506 and top and bottom flanges 508. The two side flanges 506 of the mounting bracket 102 extend from the mounting surface 502 at angles so that the edge of side flanges 506 engages with the outer surface of the tower pole along an axial contact area. Similarly, the top and bottom flanges 508 are shaped to engage with the outer surface of the tower pole along a circumferential contact area.

In one example embodiment, the side flanges 506 extend from the mounting surface 502 at an angle between 70 and 85 degrees relative to the mounting surface 502. In other embodiments, the side flanges 506 extend from the mounting surface 502 at an angle between 73 and 82 degrees relative to the mounting surface 502. In one embodiment, the side flanges 506 extend from the mounting surface 502 at an angle of substantially 77.5 degrees relative to the mounting surface 502. As used herein in reference to angles, the term substantially may mean +/−2 degrees, +/−5 degrees, or +/−10 degrees. The angle of side flanges 506 relative to mounting surface 502 may be selected to arrange flange close to radial against the cylindrical pole than the side flanges would be if oriented at 90 degrees relative to the mounting surface. In that regard, side flanges 506 may be approximately orthogonal to the surface of the pole in some embodiments.

Figure 7:
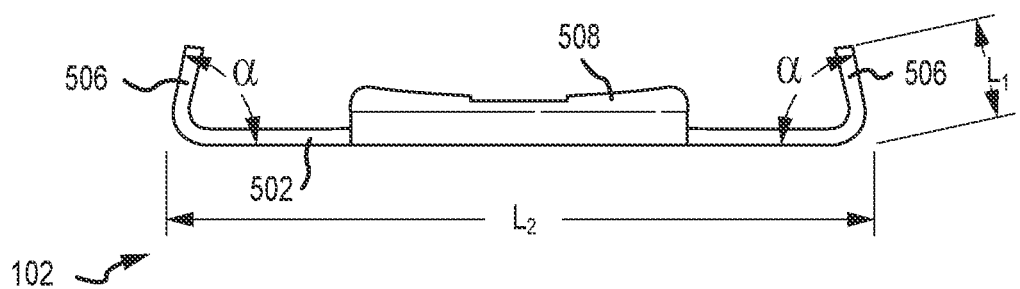
FIG. 7 illustrates a top view of a mounting bracket in accordance with various embodiments.

Turning now to FIG. 7, a top view of the mounting bracket 102 is illustrated. Mounting bracket 102 includes side flanges 506 and top and bottom flanges 508. The two side flanges 506 of the mounting bracket 102 extend from the mounting surface 502 at angles α to engage with the outer surface of the tower pole. Top and bottom flanges 508 are shaped to engage with the outer surface of the tower pole. In the embodiment of FIG. 7, the side flanges 506 are configured to extend from the mounting surface 502 at an angle α of substantially 77.5 degrees relative to the mounting surface 502. Although side flanges 506 are depicted extending from mounting surface 502 and a same angle α, the angles α for each side flange may vary in some embodiments due to design or manufacturing tolerances. Side flanges 506 in the embodiment of FIG. 7 may engage with a tower pole having a diameter of between 20 and 25 inches. As such, the mounting bracket 102 facilitates the secure mounting of the antenna structure 120 to the tower pole 122 while providing a relatively low depth of mounting.

In various embodiments, the top and bottom flanges 508 are shaped to engage with the outer surface of the tower pole. The top and bottom flanges 508 may be shaped with an edge that has a profile that at least partially conforms with the shape of the antenna tower. Top and bottom flanges 508 may also include angled surfaces and a cutout to receive the tower. The edge profile of the top and bottom flanges 508 engage with the surface of the tower pole in response to the bands being tightened.

In the embodiment of FIG. 7, the length $L_2$ of mounting surface 502 is longer than the length $L_1$ of side flanges 506. Longer lengths $L_2$ tend to increase mounting depths for communication equipment mounted to masts using mounting brackets described herein. Length $L_2$ of mounting surface 502 and length $L_1$ of side flanges 506 may be selected to arrange side flanges 506 substantially radially on a round pole or tower.

Figure 8:
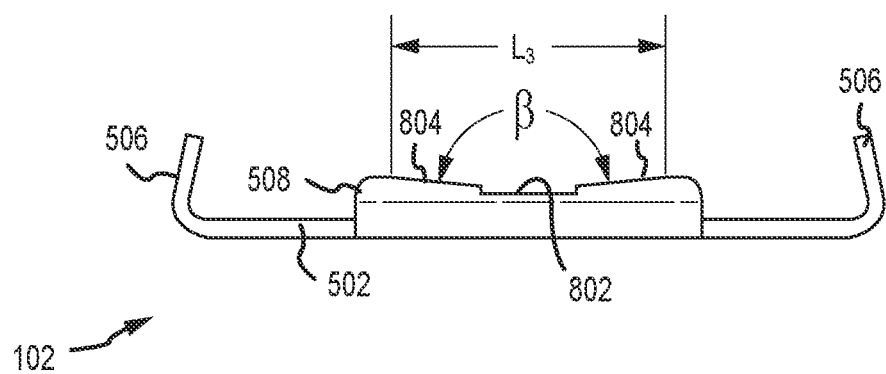
FIG. 8 illustrates a top view of a mounting bracket in accordance with various embodiments.
Figure 9:
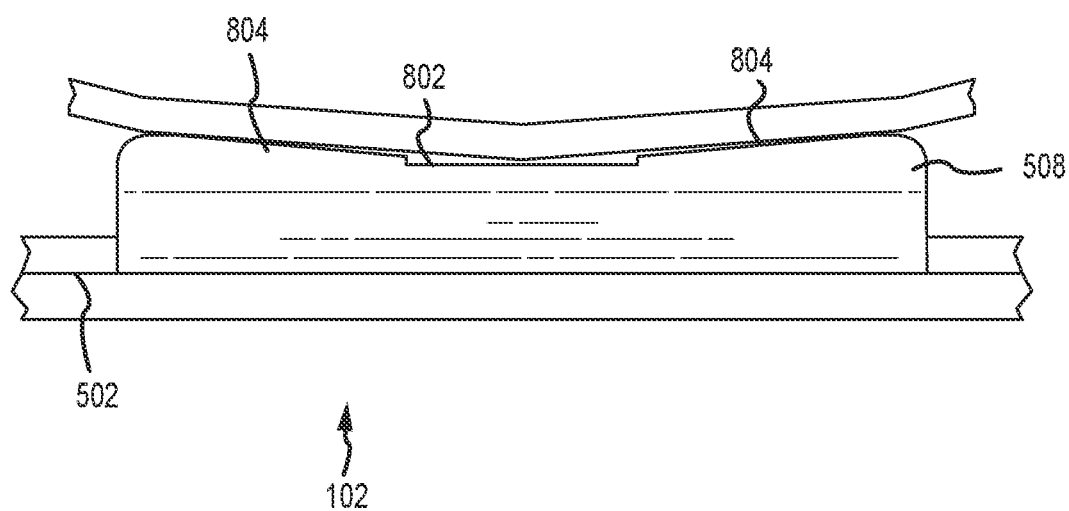
FIG. 9 illustrates a partial top view of a mounting bracket and portion of a tower pole in accordance with various embodiments.

Referring now to FIGS. 8 and 9 mounting bracket 102 is illustrated in accordance with various embodiments. Mounting bracket 102 includes side flanges 506 and top and bottom flanges 508. Top and bottom flanges 508 are shaped to engage with the outer surface of the tower pole. Top and bottom flanges 508 may thus include curved or formed edges of top and bottom flanges 508 opposite mounting surface 502.

In the example depicted in FIGS. 8 and 9, the top and bottom flanges 508 have a cutout 802 formed in the outer edge opposite mounting surface 502. Cutout 802 is formed between angled edges 804. Angled edges 804 of top and bottom flanges 508 may be substantially symmetric and may be oriented at an angle β relative to one another. Angle β is an obtuse angle less than 180 degrees but greater than 90 degrees. Angle β may be selected so that angled edges 804 are substantially tangential to a diameter of a circular pole engaging angled edges 804 within the length $L_3$. Length $L_3$ is the distance between the distal ends of angled edges 804 on a top or bottom flange 508.

Various embodiments include top and bottom flanges 508 with angled edges 804 on both sides of the center cutout 802. Cutout 802 and angled edges 804 allows the edge surfaces of the flanges 508 to engage with the surface of the tower pole (as illustrated in FIG. 9) and thus facilitates friction and a secure attachment. Angled edges 804 may flat or rounded to receive a pole or tower.

In one embodiment, the angled edges 804 of both the top and bottom flanges 508 have an interior angle β between 160 degrees and 180 degrees. In the illustrated embodiment the angled edges 804 of both the top and bottom flanges 508 have an interior angle of substantially 170 degrees. In such an embodiment, top and bottom flanges 508 can securely engage with a tower pole having a diameter of between 20 and 25 inches.

Figure 10:
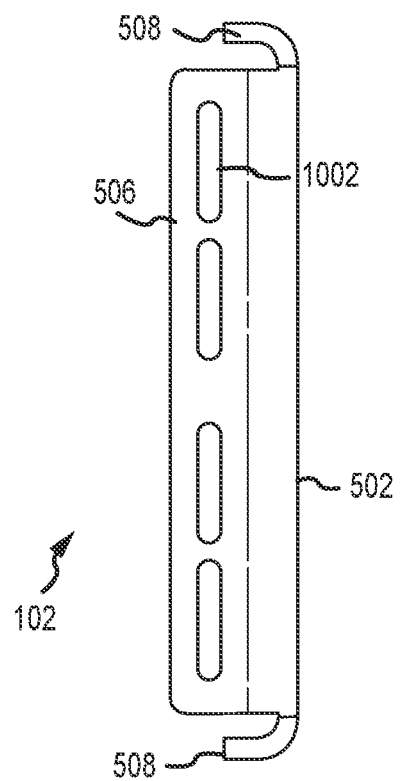
FIG. 10 illustrates a side view of a mounting bracket in accordance with various embodiments.

Turning now to FIG. 10, a side view of mounting bracket 102 is illustrated. Mounting bracket 102 includes side flanges 506 and top and bottom flanges 508. In the example of FIG. 10, side flanges 506 include slots 1002. Slots 1002 are configured to receive the bands (i.e., bands 104 of FIG. 1) to secure the mounting bracket 102 to a tower pole (e.g., tower pole 122 of FIG. 1). Slots in each side flange 506 are substantially aligned to receive a band that passes through at least one slot on each side flange 506. In general, the size and number of slots can be varied for individual applications.

The mounting brackets described herein may be made in a variety of ways. For example, the mounting brackets can be formed of a sheet of steel that is cut and then formed. In such an example the side flanges 506 can be formed by bending the flange material beyond 90 degrees until the desired final angle is reached. In other examples the side flanges can be formed through casting, welding, stamping, or other techniques.

Benefits, other advantages, and solutions to problems have been described herein with regard to example embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A mounting system for coupling communication equipment to a pole, the mounting system comprising:
    a mounting bracket including:
        a mounting surface;
        a first side flange extending from the mounting surface at a first angle less than 85 degrees relative to the mounting surface with a first bend coupling the mounting surface to the first side flange, the first side flange including a first plurality of slots;
        a second side flange extending from the mounting surface at a second angle less than 85 degrees relative to the mounting surface with a second bend coupling the mounting surface to the second side flange, the second side flange including a second plurality of slots;
        a top flange extending from a top of the mounting surface, the top flange comprising a first angled edge oriented at an obtuse angle relative to a second angled edge, wherein a cutout separates the first angled edge from the second angled edge; and
        a bottom flange extending from a bottom of the mounting surface; and
    a plurality of bands extending through the first plurality of slots and the second plurality of slots, the bands encircling the pole to couple the mounting bracket to the pole with the first side flange, the second side flange, the top flange, and the bottom flange extending from the mounting surface towards the pole.

2. The mounting system of claim 1, wherein the first angle is between 70 and 85 degrees relative to the mounting surface, wherein the second angle is between 70 and 85 degrees relative to the mounting surface.

3. The mounting system of claim 2, wherein the first bend is formed by bending a first side of a metal sheet beyond 90 degrees relative to the mounting surface, wherein the second bend is formed by bending a second side of the metal sheet beyond 90 degrees relative to the mounting surface.

4. The mounting system of claim 1, wherein the bottom flange includes a bottom center cutout.

5. The mounting system of claim 4, wherein the bottom flange includes bottom angled edges on both sides of the bottom center cutout.

6. The mounting system of claim 5, wherein the first angled edge and the second angled edge have a first interior angle between 160 degrees and 180 degrees, wherein the bottom angled edges have a second interior angle between 160 degrees and 180 degrees.

7. The mounting system of claim 1, wherein the mounting bracket is formed from a single piece of sheet metal.

8. The mounting system of claim 1, wherein the mounting surface includes a plurality of mounting holes.

9. The mounting system of claim 8, wherein the plurality of mounting holes comprises multiple sets of mounting holes for different types of communication equipment.

10. A mounting system for coupling communication equipment to a pole, the mounting system comprising:
a mounting bracket including:
a mounting surface;
a first side flange coupled to the mounting surface by a first bend, the first side flange extending from the mounting surface at a first angle between 73 degrees and 82 degrees, and the first side flange defining a first slot;
a second side flange coupled to the mounting surface by a second bend, the second side flange extending from the mounting surface at a second angle between 73 degrees and 82 degrees, and the second side flange defining a second slot;
a top flange extending from a top of the mounting surface, the top flange comprising a first angled edge oriented at an obtuse angle relative to a second angled edge, wherein a cutout separates the first angled edge from the second angled edge; and
a bottom flange extending from a bottom of the mounting surface; and
a band extending through the first slot and the second slot, the band encircling the pole to generate friction between the first side flange and the pole, between the second side flange and the pole, between the top flange and the pole, and between the bottom flange and the pole.

11. The mounting system of claim 10, wherein the first side flange is formed by bending a first side of a metal sheet beyond 90 degrees relative to the mounting surface, wherein the second side flange is formed by bending a second side of the metal sheet beyond 90 degrees relative to the mounting surface.

12. The mounting system of claim 10, wherein the bottom flange includes a bottom center cutout.

13. The mounting system of claim 12, wherein the bottom flange includes bottom angled edges on both sides of the bottom center cutout.

14. The mounting system of claim 13, wherein the first angled edge and the second angled edge have a first interior angle between 160 degrees and 180 degrees, wherein the bottom angled edges have a second interior angle between 160 degrees and 180 degrees.

15. The mounting system of claim 10, wherein the mounting bracket is stamped from a single piece of sheet metal.

16. The mounting system of claim 10, wherein the mounting surface defines a plurality of mounting holes.

17. The mounting system of claim 16, wherein the plurality of mounting holes comprises multiple sets of mounting holes for different types of communication equipment.

18. A mounting system for mounting communication equipment to a pole, the mounting system comprising:
a mounting bracket including:
a mounting surface with a plurality of mounting holes defined though the mounting surface for attaching to the communication equipment;
a first side flange extending from the mounting surface at a first angle between 73 degrees and 82 degrees, the first side flange defining a first plurality of slots;
a second side flange extending from the mounting surface at a second angle between 73 degrees and 82 degrees, the second side flange defining a second plurality of slots;
a top flange extending from a top of the mounting surface, the top flange defining a top center cutout that separates a first angled edge and a second angled edge, the top angled edges being flat and having a first interior angle between 165 degrees and 175 degrees;
a bottom flange extending from a bottom of the mounting surface, the bottom flange defining a bottom center cutout and bottom angled edges at each side of the bottom center cutout, the bottom angled edges being flat and having an interior angle between 165 degrees and 175 degrees; and
a plurality of bands extending through the first plurality of slots and the second plurality of slots, the bands encircling the pole to couple the mounting bracket to the pole with the first side flange, the second side flange, the top flange, and the bottom flange contacting the pole.

19. The mounting system of claim 18, wherein the first side flange is formed by bending a first side of a flat metal beyond 90 degrees relative to the mounting surface, wherein the second side flange is formed by bending a second side of the flat metal beyond 90 degrees relative to the mounting surface.

20. The mounting system of claim 18, wherein the mounting bracket is formed from a single piece of sheet metal.

\* \* \* \* \*